United States Patent Office 2,787,575
Patented Apr. 2, 1957

2,787,575

ZINC-GLYCINE-INSULIN COMPOSITION AND PRODUCTION THEREOF

Jan Daniël Herman Homan, Oss, and Jan Lens, Nimeguen, Netherlands, assignors to Organon, Inc., Orange, N. J., a corporation of New Jersey No Drawing. Application November 20, 1951,
Serial No. 257,406

Claims priority, application Netherlands
November 22, 1950

3 Claims. (Cl. 167—75)

The invention relates to the production of insulin preparations which exert quick action after administration and at the same time have a prolonged action. Many insulin preparations are known which cause a decrease of the bloodsugar content during a period which is longer than the period of activity of pure insulin. Most of these preparations display the property that under the circumstances, as prevailing in the body tissue, they have a very slight solubility. Compared with pure insulin which dissolves readily at a pH value of about 7 of the tissue liquids, and consequently can be rapidly absorbed, the absorbability of the preparations which are soluble with difficulty is much slighter under the same circumstances.

Such preparations in general consist of a combination of insulin with another substance which can form with the insulin a compound which is soluble with difficulty at a pH value of about 7. For this purpose use was made e. g. of protamine, histone, protones, polypeptide-like substances and reaction products of formaldehyde with guanidine, resp. alkoxyphenethyl amines (vide e. g. the Netherlands patent specification 41,849, U. S. P. 2,232,641, British patent specifications 500,654 and 518,624 and U. S. patent specifications 2,219,350 and 2,354,211). In most cases the prolonged action of the compounds can furthermore be strengthened by the addition of salts of e. g. magnesium, copper, cobalt, cadmium, zinc or iron.

The abovementioned preparations all contain a more or less complicated organic compound and in general do not meet the requirement of rapid action after administration.

Furthermore some preparations are known which beside a prolonged action also have a rapid action and yet are poorly-soluble at a pH value of 7, e. g. the combination of globine and insulin (vide the British patent specification 508,983) and a protamine-insulin preparation in which particular care has been given to the fine crystalline habitus of the particles dispersed at the pH value of about 7 (vide the Swiss patent specification 255,252 and the U. S. P. 2,538,018).

The U. S. P. 2,143,591 mentions an insulin preparation with a strongly prolonged action which in acid solution contains additionally added zinc salt besides insulin in a quantity of from 25 to 500% of the weight of the insulin. The prolonged action hereof is comprised by the known effect that zinc salts with protein-like hormones cause a delayed resorption. Comp. L. C. Maxwell, Am. Journ. Physiol. 110, 458 (1934/35). These preparations with strongly prolonged action have so much metal that the rapidity of the action is slight.

It was found that it is possible to prepare, in a very simple manner, insulin which has a prolonged as well as an immediate blood sugar lowering effect. Thereby, use is made of metal salts which are capable of delaying absorption of the hormone by the body. It is not necessary to use, as heretofore, complex organic compounds which are foreign to the body, to cause such prolonged effect. The new preparation represents an aqueous suspension of a solid amorphous insulin-metal complex compound. It is prepared by adding a small amount of such a metal salt or of a mixture of such metal salts capable of delaying absorption of insulin by the body, to an aqueous insulin solution and adjusting the pH-value of the mixture to between about 6.5 and 8.0. Said metal salt is added to said insulin solution, according to this invention, in an amount of from about 0.5 mg. to about 1.0 mg. calculated with respect to the metal content of said salt, per 100 units of insulin.

Crystalline insulin contains per se about 0.4% by weight of zinc. It is readily and completely soluble in water at a pH above 6.5. By the addition of the above mentioned comparatively small amount of a metal salt capable of delaying absorption of the hormone by the body, to such crystalline insulin, its solubility is decreased and it becomes insoluble even at a pH between about 6.5 and 8.0.

The slight solubility of said new insulin metal complex compound at said pH between 6.5 and 8.0 is responsible for its prolonged action while the fact that said new insulin metal complex compound is relatively readily dissociated, is responsible for the quick onset of insulin action.

For carrying out the process according to the invention there are used the salts of e. g. nickel, cobalt, zinc, cadmium, copper, iron or aluminium or mixtures of salts of one or more metals with delaying action, the total quantity of the metal to be added being determined by the limits indicated above.

The suspensions formed with the said quantities of metal salts do not contain any dissolved hormone in the liquid phase. The present preparations in which the delaying influence of the metal salts per se at most can be of secondary importance, have a moderately prolonged action. This as well as its immediate action were established on clinical application. On comparing the action of the new preparation according to the present invention with that of the insulin preparation described in the U. S. P. 2,538,018 it was found that the new preparation, practically yields the same effect with regard to rate of action and its duration. Apparently the crystalline form of the suspended particles is not essential for an insulin preparation to impart thereto a moderately prolonged action. The production of the insulin preparation, according to the invention, which preparation with respect to its stability is not inferior to the known one, is in contrast thereto far less complicated in that it is not necessary to process protamines and to pay special attention to the preparation of the specific crystalline habitus of the suspended particles.

An advantage of the present suspension lies furthermore in the possibility to isolate, if desired, the active solid substance, and to disperse it again, e. g. in a physiological salt solution without the suspension dissolving.

A particularly useful embodiment of this process can be obtained by preparing said suspensions in the presence of one or more compounds which form a soluble complex compound with the above mentioned metals at a pH value of about 6.5 to 8. Due to the presence of said compounds the excess metals remain in solution at this pH value. The insulin preparation precipitated at said pH values, consequently, is a metal complex compound and not merely a form of insulin bound by adsorption to an insoluble metal hydroxide as a carrier.

Examples of compounds which can form soluble complexes with the metals are compounds applied as buffers, such as glycine buffer and buffers prepared with aspartic acid, glutamic acid, citric acid and tartaric acid and polyvalent alcohols such as glycerol and hexites. Preferably a glycine buffer is applied.

In the following examples the process according to the invention is further elucidated.

Example I 1.6 g. of insulin containing 25 U per mg. (total 40,000 U) are dissolved in 25 cm.³ of 0.1 N hydrochloric acid. To the aqueous solution a solution of 7.6 g. of sodium chloride, 3 g. of tricresol and 700 mg. of anhydrous zinc chloride in water are added, so that the solution obtains a final volume of 950 cm.³. Thereupon the pH value of the solution is adjusted to 7.1 with 1 N solution of sodium hydroxide by which a suspension is obtained. Finally the liquid is made up with water to 1 liter. This preparation is isotonic and has the strength of a preparation for injection.

Example II

A solution is prepared of 1.8 g. of insulin having an activity of 22.5 U per mg. in 25 cm.³ of 0.1 N hydrochloric acid. Hereto an aqueous solution of 7.6 g. of sodium chloride and 3 g. of tricresol are added by which the volume of the solution is brought at 800 cm.³. To this liquid then a solution of 1.5 g. of glycine and 600 mg. of anhydrous zinc chloride in water is added which solution has been adjusted with 0.1 N solution of sodium hydroxide to a pH value=7.2 and has a volume of 200 cm.³. Thereby 1 liter of insulin suspension with a pH value=7.1 is obtained.

Example III 1.8 g. of insulin, containing 22.5 U per mg., are dissolved in 25 cm.³ of 0.1 N hydrochloric acid. Hereto a solution of 7.6 g. of sodium chloride and 3 g. of tricresol in water is added so that altogether 800 cm.³ of liquid are obtained. To this solution are added 200 cm.³ of an aqueous solution in which there are 1.5 g. of glycine and 380 mg. of cobalt in the form of cobalt chloride and of which the pH value has been adjusted to 7.1 with a solution of 1 N sodium hydroxide. In this manner 1 liter of insulin suspension with a pH value=7.0 is obtained.

Instead of 380 mg. of cobalt also 400 mg. of nickel as nickel chloride or a mixture of nickel- and cobalt-salts can be used.

Example IV

A solution is prepared of 1.6 g. of insulin having an activity of 25 U per mg. in 25 cm.³ of 0.1 N hydrochloric acid to which a solution of 7.6 g. of sodium chloride and 3 g. of tricresol are added in so much water that a solution of altogether 800 cm.³ is obtained. To this solution are added 200 cm.³ of an aqueous solution of 2.9 g. of glutaminic acid and 400 mg. of copper as cuprichloride with a pH value=6.8 adjusted with the aid of a solution of 1 N sodium hydroxide. In this manner 1 liter of insulin suspension with a pH value=6.7 is obtained.

Example V

A solution is made of 1.8 g. of insulin with an activity of 22.5 U per mg. in 24 cm.³ of 0.1 N hydrochloric acid. Hereto a solution of 7.6 g. of sodium chloride, 3 g. of tricresol, 2.6 g. of asparaginic acid and 800 mg. of anhydrous zinc chloride in 900 cm.³ of water are added. The liquid thus obtained is neutralised with 1 N solution of sodium hydroxide to a pH value=7.0 whereby a suspension is formed which is diluted with water to 1 liter.

Example VI

To a solution of 1.6 g. of insulin with an activity of 25 U per mg. in 25 cm.³ of 0.1 N hydrochloric acid, a solution of 7.6 g. of sodium chloride, 3 g. of tricresol, 1.5 g. of glycine and 380 mg. of aluminum in the form of aluminumchloride in 900 cm.³ of water is added. The pH value of the mixture thus obtained is adjusted to 7.4 with 1 N solution of sodium hydroxide, whereupon the volume of the suspension is made up to 1 liter with water. Instead of aluminum chloride also ferrichloride can be used, e. g. in a quantity of 320 mg. of iron. Also a mixture of aluminum- and ferri-chloride can be applied.

What we claim is:

1. In a process of producing an insulin preparation having a prolonged blood sugar lowering effect, the steps comprising adding to an aqueous insulin solution a zinc salt causing delayed absorption of insulin by the body, said salt being added in an amount corresponding to about 0.5 mg. to about 1.0 mg. of the zinc component thereof per 100 units of insulin, and glycine forming a complex compound with said salt, said complex compound being water soluble at a pH between about 6.5 to about 8.0, and adjusting the pH-value of the resulting reaction mixture to between about 6.5 and about 8.0, to form an aqueous suspension of an insulin-zinc complex compound being substantially insoluble in water at said pH.

2. In a process of producing an insulin preparation having a prolonged blood sugar lowering effect, the steps comprising adding an aqueous solution of a zinc salt causing delayed absorption of insulin by the body, and glycine forming a complex compound with said metal salt, said complex compound being water soluble at a pH between about 6.5 to about 8.0, said solution being adjusted to a pH-value between about 6.5 and about 8.0, to an aqueous solution of insulin, thereby maintaining the pH-value of the reaction mixture between about 6.5 and about 8.0, the proportion of zinc salt to insulin in said reaction mixture being about 0.5 mg. to about 1.0 mg. of the zinc component of said salt per 100 units of insulin, to form an aqueous suspension of an insulin-zinc complex compound being substantially insoluble in water at said pH.

3. An aqueous suspension of an insulin-zinc complex compound adjusted to a pH-value between about 6.5 and about 8.0, the zinc component of said insulin-metal complex compound causing delayed absorption of insulin by the body, the proportion of said zinc component to insulin being about 0.5 mg. to about 1.0 mg. per 100 units of insulin, said suspension containing glycine forming a complex compound with said zinc component, said complex compound being water soluble at a pH between about 6.5 to about 8.0, said suspension, on administration to the body, causing rapid lowering of the blood sugar and having, at the same time, a prolonged effect.

References Cited in the file of this patent

UNITED STATES PATENTS

| | | |
|---|---|---|
| 2,143,590 | Scott | Jan. 10, 1939 |
| 2,143,591 | Scott | Jan. 10, 1939 |
| 2,179,384 | Scott et al. | Nov. 7, 1939 |
| 2,232,641 | Scott et al. | Feb. 18, 1941 |